(No Model.)

J. B. SIMS.
GEAR FOR TRANSMITTING MOTION.

No. 327,730. Patented Oct. 6, 1885.

Witnesses
M. C. Massie
E. E. Hoffman

Inventor
John B. Sims
By his Attorney
Wm Hunter Myers

UNITED STATES PATENT OFFICE.

JOHN B. SIMS, OF YELLVILLE, ARKANSAS.

GEAR FOR TRANSMITTING MOTION.

SPECIFICATION forming part of Letters Patent No. 327,730, dated October 6, 1885.

Application filed August 17, 1885. Serial No. 174,570. (No model.)

*To all whom it may concern:*

Be it known that I, JOHN B. SIMS, a citizen of the United States, residing at Yellville, in the county of Marion and State of Arkansas, have invented certain new and useful Improvements in Gear for Transmitting Motion; and I do hereby declare the following to be a full, clear, and exact description of the invention, such as will enable others skilled in the art to which it appertains to make and use the same.

My invention relates to an improvement in gearing; and it has for its object to provide a gearing for transmitting motion which will be subject to a comparatively small amount of friction, and yet perform its office in a reliable manner.

Figure 1:
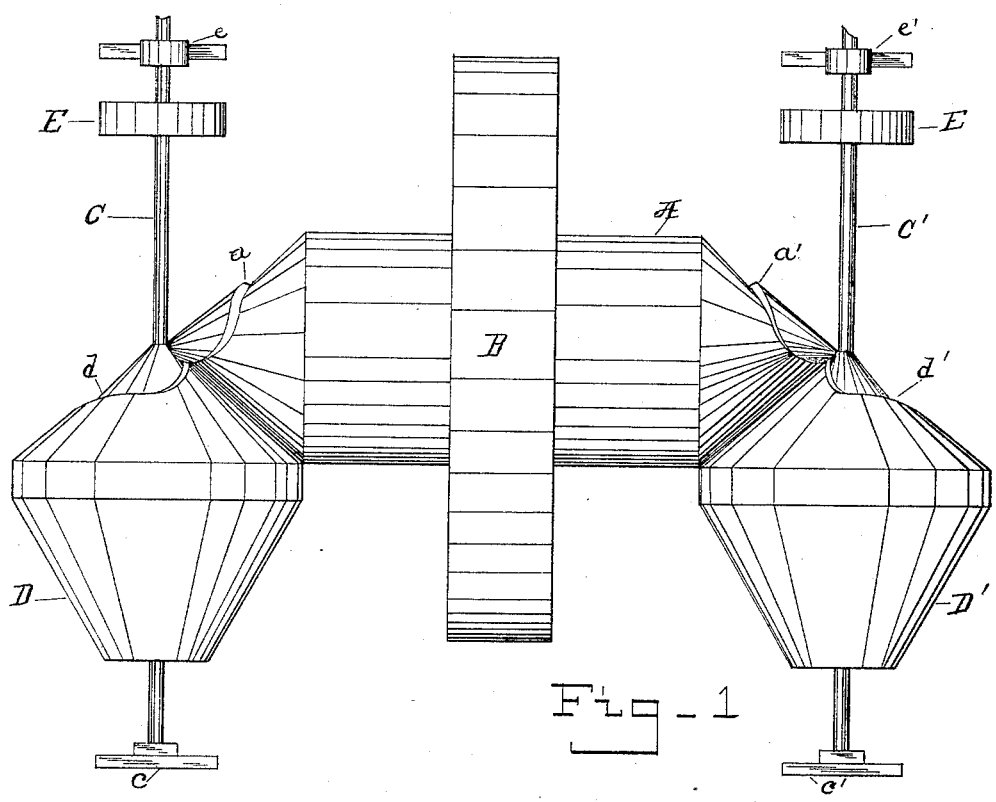
Figure 2:
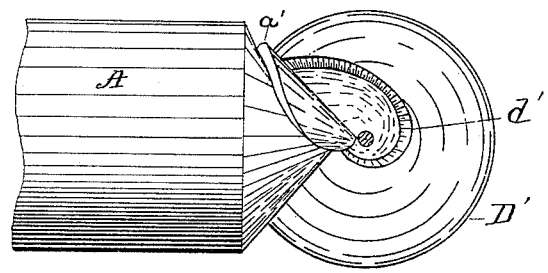

Figure 1 of the accompanying drawings represents a front elevation of my invention. Fig. 2 is a plan view of the right-hand end of shaft A and the corresponding gear.

Referring to the drawings, A represents a horizontal shaft, on which is mounted a band-wheel, B. The ends of shaft A are conically formed at an angle of forty-five degrees, and from the apex of the cone to its circumference on each end is formed a volute, $a a'$, the volute on one end of the shaft running in a direction opposite to that on the other end.

C C' represent shafts at a right angle to shaft A, and on these shafts are secured conical gears D D' of a diameter just equal to that of shaft A, the upper surface of each of which has an inclination of forty-five degrees. On these gears are formed volutes $d d'$, extending from the apex to the circumference, similar to the volutes formed on the ends of shaft A, the volute of one gear running in a direction opposite to that of the other. For the purpose of making the gears as light as possible and to still obtain great strength, I prefer to make their lower portion the frustum of a cone, as shown in the drawings.

Shafts C C' rest in steps $c c'$, and have bearings in brackets $e e'$. They are provided with belt-pulleys E E', which are to be connected by means of belts with the machinery to be operated. It is evident that separate machines may be driven from shafts C and C'; but if only one of those shafts be employed as a driving-shaft, the other may run idle.

The herein-described arrangement of the shafts and gears is not designed as a mere duplication of mechanism to transmit power to different machines; but by forming a volute on each end of shaft A and placing a voluted gear in connection therewith I obtain an easier and more even movement of that shaft than if one of its ends were journaled in a bearing.

Power is applied to shaft A, and through it to gears D D' and shafts C C' by means of a belt leading from any suitable motor to and around band-wheel B. It will be evident on inspection of the drawings that as shaft A revolves, its volutes $a a'$ will mesh with the volutes $d d'$ on gears D D', and thus impart motion to shafts C C' and the belt-pulleys thereon.

Having thus described my invention, what I claim as new, and desire to secure by Letters Patent, is—

1. A gear for transmitting motion, composed of two cones set at right angles to each other, each of said cones being formed with a volute extending from its apex to its circumference, these volutes intermeshing one with the other, substantially as described.

2. The combination, with horizontal shaft A, whose ends are conical and have volutes formed thereon from the apex to the circumference, of conical gears secured to shafts at right angles to shaft A, said gears having volutes formed thereon which coincide and intermesh with the volutes on the horizontal shaft, substantially as described.

In testimony whereof I affix my signature in presence of two witnesses.

JOHN B. SIMS.

Witnesses:
M. C. MASSIE,
A. B. SCOTT.